Jan. 7, 1936.    C. W. VOGT    2,027,256
REFRIGERATING APPARATUS
Filed May 2, 1934    5 Sheets-Sheet 1

INVENTOR
Clarence W. Vogt
BY
ATTORNEYS

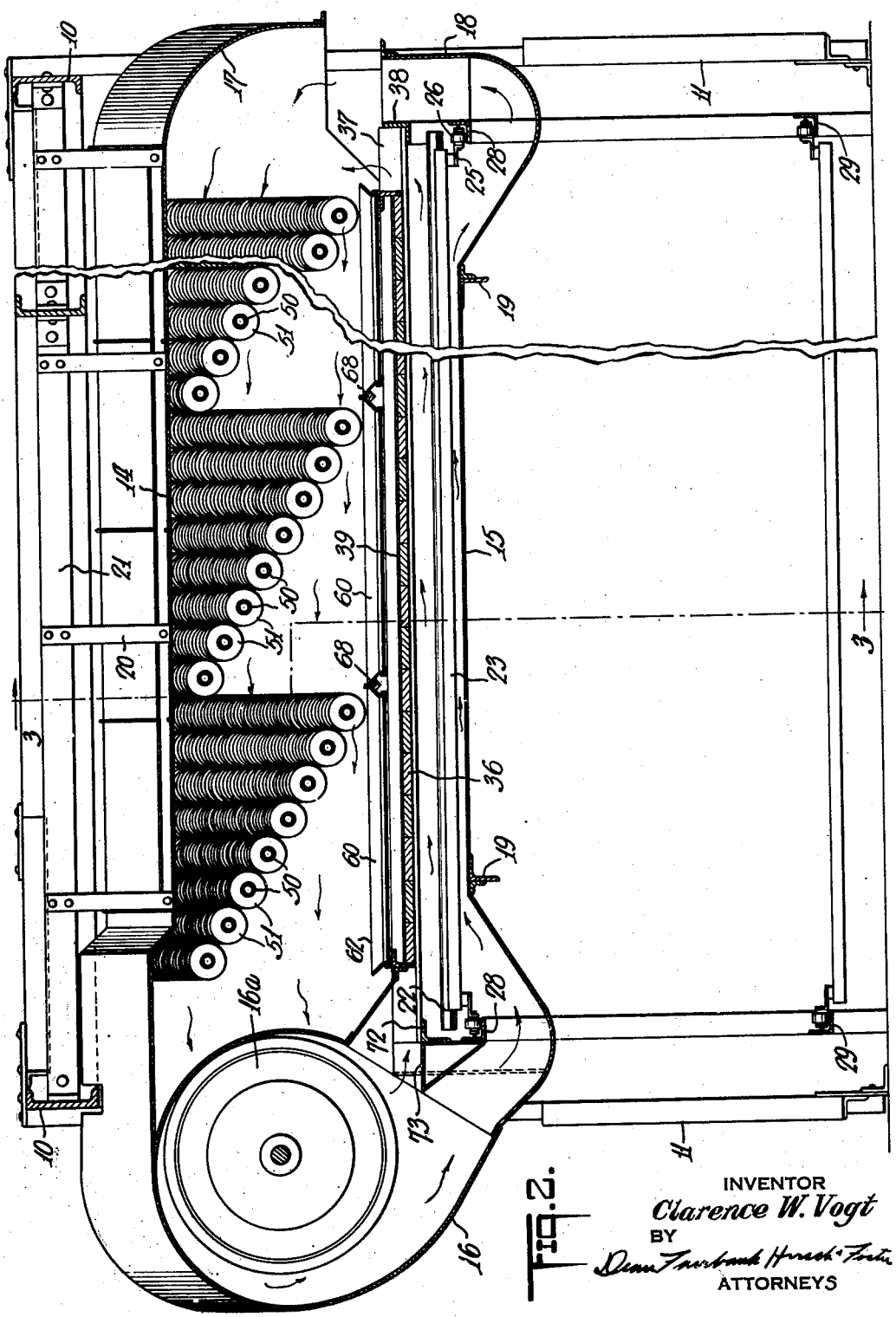

Jan. 7, 1936.  C. W. VOGT  2,027,256
REFRIGERATING APPARATUS
Filed May 2, 1934   5 Sheets-Sheet 3
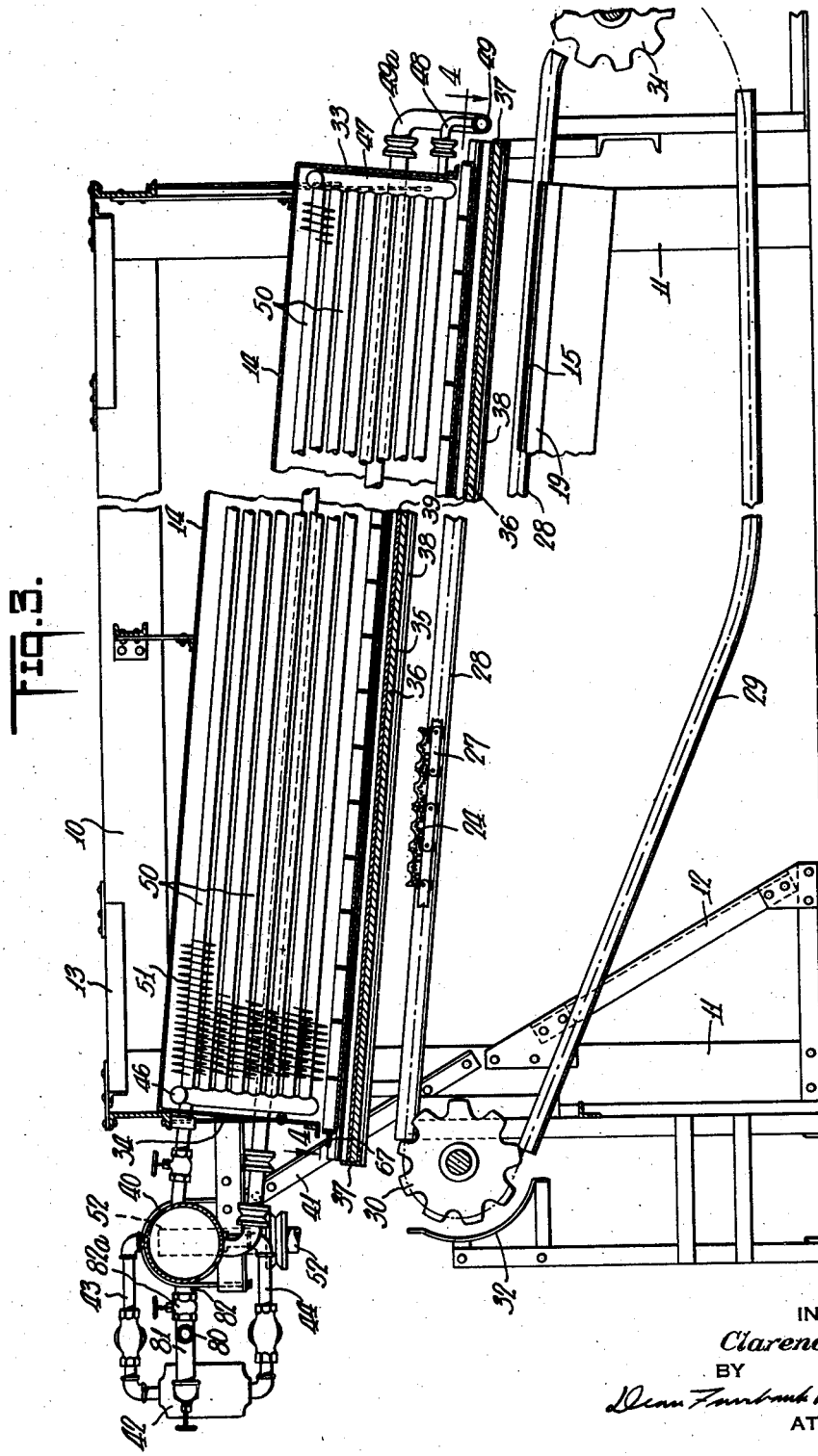
INVENTOR
Clarence W. Vogt
BY
ATTORNEYS

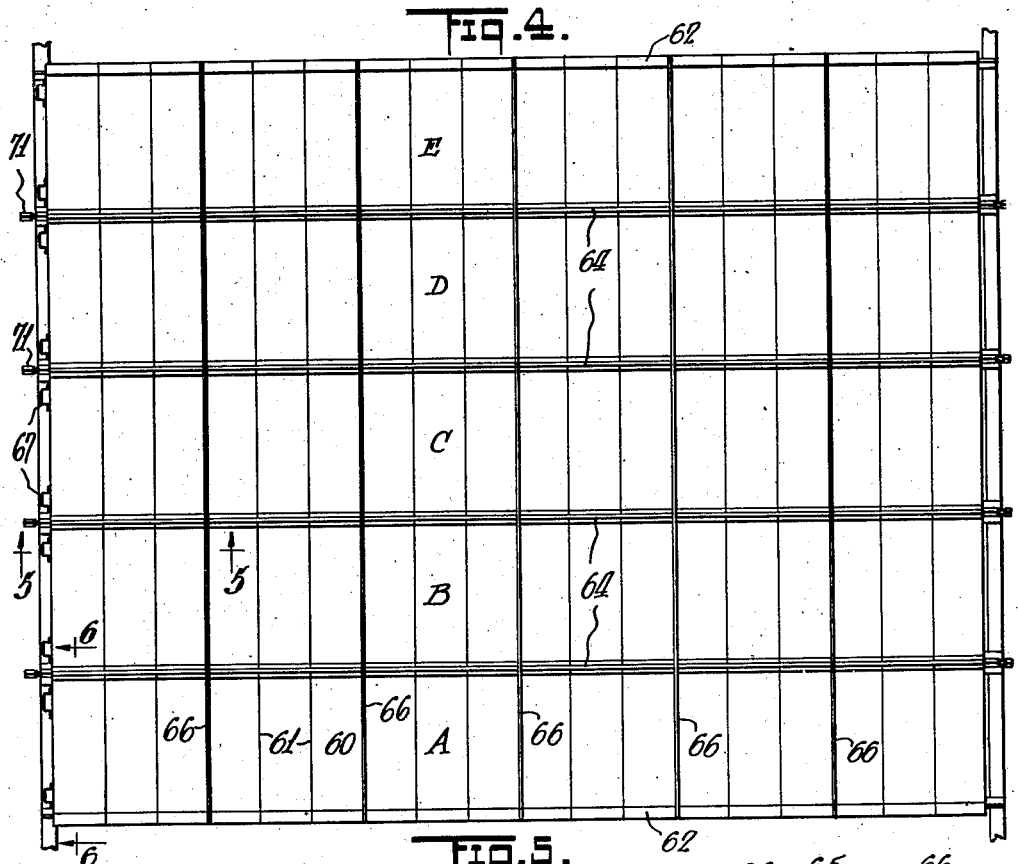
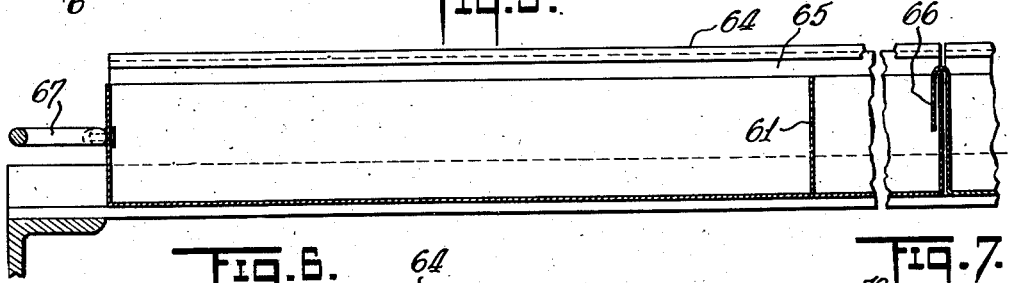

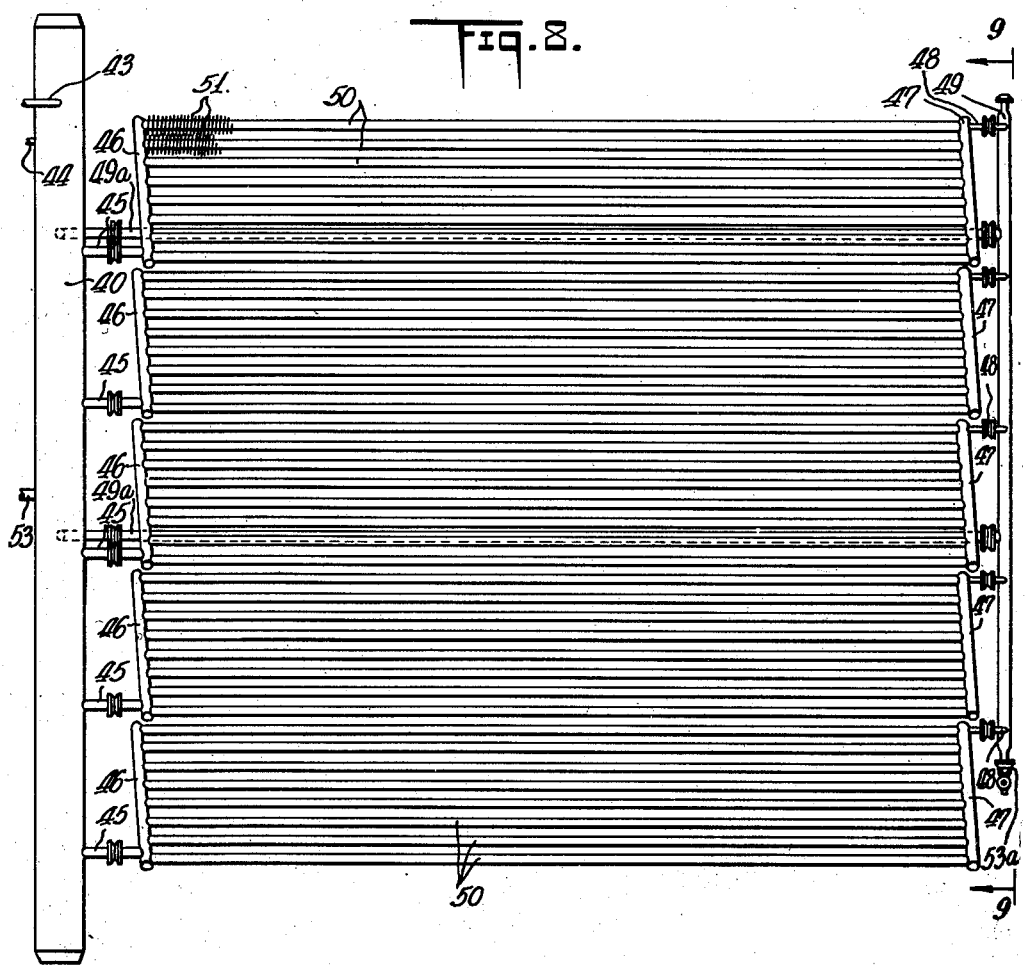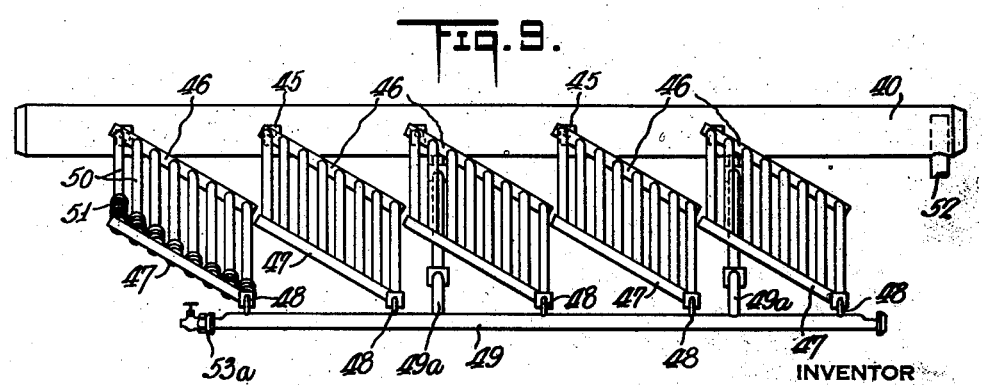

Patented Jan. 7, 1936

2,027,256

UNITED STATES PATENT OFFICE 2,027,256

REFRIGERATING APPARATUS

Clarence W. Vogt, Louisville, Ky., assignor to Vogt Processes, Incorporated, Louisville, Ky., a corporation of Delaware Application May 2, 1934, Serial No. 723,454

12 Claims. (Cl. 62—114)

This invention relates to apparatus for changing the temperature of a gaseous medium and for subjecting articles or material to the action of said medium during the advancing of the material or articles through the treating chamber.

The specific embodiment hereinafter described was designed for hardening long peripherally wrapped bars of plastic ice cream or the like, which are conveyed in parallelism through a hardening chamber and which may later be cut into short sections such as those disclosed and claimed in my prior Patent 1,906,183, issued April 25, 1933.

The invention provides a highly efficient, compact hardening apparatus to effect complete hardening of such bars or other material by passing an intensely cold stream of air about them as they are continuously advanced by the conveyer. The invention further involves the provision of a refrigerating unit in the path of the circulating air, and so arranged that it assures uniform and efficient cooling of the circulating stream, yet opposes but minimum resistance to air flow.

An object of the invention is to provide a compact unit consisting of a substantially enclosed chamber in which refrigerating pipes are located together with means for circulating a current of air in a substantially closed cycle over the pipes and about the material to be chilled or hardened, the refrigerating pipes themselves being so arranged that they insure chilling of every part of the air current and afford a maximum area of heat transfer surface with respect to the air flow resistance which they offer.

Another object is to provide a compact arrangement of sectional pans for catching the drip or falling ice from the pipes during defrosting operations and to so design the apparatus that defrosting and subsequent removal and dumping of the pans may be accomplished during the normal and the continuous operation of the conveyer and the freezing of the bars.

Another object is to provide an apparatus in which the unwrapped exposed ends of the ice cream bars are protected from a direct blast of cold air and thus dehydrated to the minimum extent.

Another object is to provide sectional drip pans which cover a relatively large area beneath the cooling pipes and the sections so constructed that they may be conveniently withdrawn separately and emptied, even though the walls of the hardening room closely encompass the actual hardening chamber.

Another object is to provide means for quickly separating drip pans which have been frozen together so that the pans may be independently removed.

The invention may be more fully understood from the following description in connection with the accompanying drawings wherein:—

Fig. 2 is a transverse section therethrough on the line 2—2 of Fig. 1,

Figure 1:
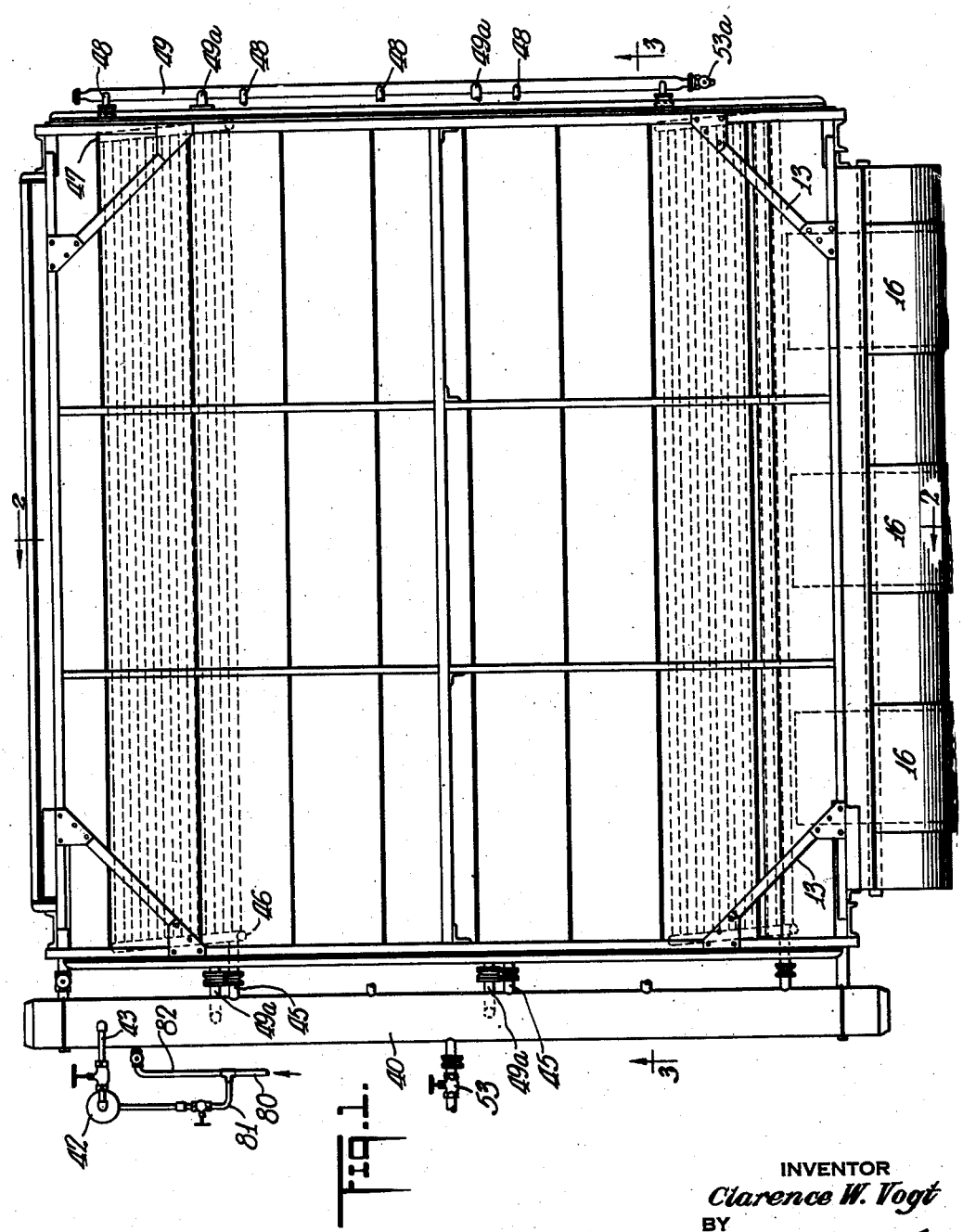
Fig. 1 is a top plan view of an apparatus embodying the invention.

Fig. 3 is a broken longitudinal sectional view taken approximately on the line 3—3 of Figs. 1 and 2, Fig. 4 is a plan view of the pans, Fig. 5 is an enlarged transverse sectional detail on the line 5—5 of Fig. 4, Fig. 6 is a similar view on the line 6—6 of Fig. 4, Fig. 7 is an enlarged sectional plan detail on the line 7—7 of Fig. 6, Fig. 8 is a plan view of the refrigerating pipes and headers, and Fig. 9 is an end view thereof.

For the sake of simplicity of the illustration I have omitted any showing of the mechanism for delivering the bars to be hardened and also any showing of the mechanism for carrying off or severing these bars after hardening.

The apparatus illustrated is adapted to be entirely confined within the walls of a hardening room which need be of but little greater height, width or length than the apparatus which I have shown, it being of course desirable to restrict the dimensions of this hardening chamber as much as possible and thereby minimize the total amount of air which needs to be maintained at the proper temperature, typically in the order of —30° F.

In the drawings I have shown a frame structure consisting of an elevated rectangular frame 10 supported at its corners on four legs 11. The legs may be braced at 12 if desired and the frame 10 may be braced by a diagonal bracing means 13.

Suitably supported in inclined position substantially within the confines of the legs 11 is an air circulating chamber which includes a ceiling plate 14 and a floor plate 15. One side of this chamber is closed by fan casings 16 for housing the fans 16a, and at its opposite side the chamber is closed by air current deflectors 17 and 18 carried by the edges of the ceiling plate 14 and floor plate 15 respectively. There may be a plurality of the fans mounted on the same shaft, but spaced apart so that each fan draws in air at its opposite ends and delivers it from the periphery.

The floor plate 15 may be mounted upon fore and aft extending inclined angle iron supports 19 and the ceiling plate is preferably suspended by hangers 20 from cross pieces 21 secured at their ends to opposite sides of the main rectangular frame 10.

The elongated enwrapped bars of ice cream 22 are carried through the lower portion of the air circulating chamber and in an up-hill direction by a conveyer of the general character disclosed in copending application Serial No. 678,624, filed July 1, 1933. This conveyer includes a plurality of elongated trough-like bar carriers 23 preferably of highly heat conductive material and having projecting radiating fins 24 on their under or convex surfaces. The ends of the troughs carry brackets 25 having rollers 26 and connected by chain links 27 in such fashion that the individual troughs are retained substantially in lateral abutment as they travel in a direction transverse to their length through the cooling chamber.

A trackway is provided to support the conveyer mechanism, and includes a pair of inclined rails 28 disposed laterally of and just below the body portion of the floor plate 15 (Fig. 2) so that the troughs 23 travel just above the floor plate as they pass through the air circulating chamber. The trackway also includes a pair of inclined trackways 29 for supporting the idling run of the endless conveyer as the empty troughs travel along in inverted position back to the point where they receive new bars to be hardened.

The rollers which support the endless chain of troughs engage with relatively deeply grooved sprocket wheels 30 and 31 at opposite ends of the upper trackway 28, it being understood that at the region of the sprocket 31 any suitable means is provided for delivering bars of ice cream to the troughs as they pass in succession beneath the depositing means. As the bar carriers pass around the sprocket wheels 30, the ice cream bars are held in place on the carriers by a curved guide 32 until they reach a point below the sprocket wheels and then drop out. They may drop directly through or be conveyed to a suitable cutter mechanism (not shown) for subdividing them into shorter lengths.

The air circulating chamber is divided into a relatively deep upper portion and a relatively shallow lower portion by a partition member 35 inclining at the same angle as the ceiling plate and floor plate of the chamber and formed of any suitable material such as wooden boards or other insulators 36 which may be supported on suitable cross members 37 which are carried by angle irons 38, the boards if desired being covered with a removable top plate 39.

The space between the partition 35 and the ceiling plate 14 accommodates the cooling pipes. This space is provided with generally vertical walls 33 and 34 at the forward upper end and the rear lower end, both walls terminating closely adjacent to or in contact with said partition 35.

The arrangement of the cooling pipes constitutes one feature of the invention, these pipes being so arranged that they afford uniform cooling of all of the air passing between the partition 35 and the ceiling plate 14 under the influence of the fans and at the same time offer a minimum impedance of air flow.

By inclining the working run of the conveyer the cooling pipes may be similarly inclined at a uniform distance from the conveyer and the partition, and gravity utilized to maintain the refrigerant flow. The pipes may constitute part of a flooded ammonia refrigerating system which includes an elongated receiver 40 supported in elevated position and outwardly beyond the upper end of the air circulating chamber on suitable brackets 41 carried by the main frame. The liquid level of the volatile refrigerant, such as ammonia, in this receiver is maintained by a float controlled chamber 42 of conventional type, the two chambers being connected by pipes 43 and 44. The liquid refrigerant is delivered to the float controlled valve in the float chamber through a supply pipe 80 and branch pipe 81. A second branch 82 leads directly to the receiver 40 so that if the float valve sticks or fails to work the valve in the branch 82 may be opened and those in the branch 81 and pipes 43 and 44 closed, and the float chamber removed for repair or adjustment.

The control of the supply of refrigerant to the receiver is merely a conventional type and forms no portion of my invention.

As best seen in Figs. 8 and 9, the evaporating or cooling apparatus includes a series of sections or units each including a pair of inclined headers 46 and 47 which extends substantially from the top to the bottom of that portion of the air circulating chamber lying between partition 35 and ceiling plate 14. The headers 46 are adjacent to the wall 34 at the upper end of the chamber, and the headers 47 are adjacent to the wall 33 at the lower end of the chamber. The lower end of each of the headers 46 and 47 terminates in a vertical plane closely adjacent to the plane of the upper end of the next adjacent pair of headers. The two headers of each section or unit are connected by a plurality of pipes 50 having cooling fins 51. These pipes 50 of the separate sections or units, viewed transversely as in Fig. 2, are arranged in separate parallel diagonal rows with all of the pipes inclining downwardly from the headers 46 toward the headers 47. Thus the current of air passing through the refrigerated space from the right to the left of Fig. 2 will be uniformly cooled. By arranging the pipes in diagonal rows rather than vertical rows and spacing them laterally apart a sufficient distance so that the fins of one pipe may clear the fins of the other, there is provided a much greater area of cooling surface with a given number of pipes. The lower headers 47 are all connected at their lower ends by pipes 48 to a manifold 49 which receives liquid from the receiver 40 through pipes 49a, and the upper headers 46 discharge their gas and unevaporated liquid to the receiver 40 through pipes 45. The evolved gases passing back into the receiver 40 are drawn off to the compressor or absorber, for instance through a stand pipe 52 having its upper end disposed above the liquid level in the receiver 40.

It is necessary to defrost the pipes from time to time and there are provided drip pans to receive the ice and water which drop from the cooling pipes during such defrosting. It will be understood that the defrosting in an apparatus of this character may be accomplished simply by shutting off the supply of refrigerant, waiting until all the liquid in the receiver has been drained out and evaporated, and then admitting hot gas through the pipe 53. One may if desired open the drain valve 53a of the manifold 49 and thus more rapidly withdraw the liquid refrigerant as well as any less volatile liquid which may be present. The hot gas loosens the ice which has formed on the cooling pipes and permits it to fall away by gravity. The defrosting does not require any cessation of operation of the apparatus since it is not carried on to an extent which would permit the air in the system to warm up materially, but is merely carried on to a sufficient extent to loosen the ice on the pipes, the heat being applied inside instead of outside of the ice coating. It is not desired to continue the heating until the ice is entirely melted so that the water may drain out. The heating of the pipes does not raise the temperature of the drip pans which is normally far below the freezing point of water so that the ice and water dropping from the pipes during defrosting freezes almost instantly to the pans.

The removal of the drip pans involves certain difficulties because of the area covered by them and the fact that the entire unit illustrated in Fig. 3 is preferably closely confined within the walls of the hardening room and very long or large drip pans could not be pulled out from under the pipes for emptying without materially increasing the size of the hardening room. In my improved construction, as best illustrated in Figs. 2 and 4 to 7, there are provided a plurality of longitudinally extending sets of pans, each set consisting of a plurality of pans detachably connected together so that a single set may be pulled out, the separate pans being detached in succession as they emerge from beneath the pipes. Thus there need be merely sufficient space between the upper end of the hardening chamber and the wall of the room to permit one pan to be manipulated at a time.

These sets of pans are indicated in top plan view in Fig. 4 and for convenience are designated as sets A, B, C, D and E. Each set consists of a plurality of pan units 60 and each pan unit is divided transversely by partitions 61 to prevent the ice and meltage from all collecting in one end of the inclined pan. In transverse section it will be observed that the pans are provided with laterally flared sides 62 (Fig. 6) and with relatively narrow vertical portions 63 which slide on guide rails 64a. To prevent drip between the laterally adjacent pan sets, one edge of each pan is provided with an upwardly extending portion turned over to provide a downwardly facing channel 64 which receives the upwardly extending flange 65 at the adjacent edge of the pan of an adjacent set, the channel 64 and the lip which enters it guarding against any drip between pans.

Correspondingly the pans of each set are so interlocked with each other that there can be no drip between them, each pan at one end being formed with a downwardly turned flange 66 (Fig. 5) which hooks over the edge of an adjacent pan and couples all the pans of the set for unitary endwise movement. Preferably a handle 67 is provided on the uppermost pan of each set for conveniently drawing the pan sets upwardly along their inclined tracks 64a. As each pan is pulled beyond its supports it is lowered to disengage it from the flange 66 of the next pan and the latter is then pulled up and disengaged.

Inasmuch as there is some danger of adjacent sets of pans being frozen to each other at the region of channel 64 and lip 65, or frozen to their supporting rails, suitable jogger mechanism is provided for striking or lifting the pans and breaking any frozen bond between pans of adjacent sets. This jogger mechanism consists of elongated rods 68 of square cross section having rounded portions 69 journaled in bails or retaining wires 70 attached to the framework of the machine.

As illustrated in Fig. 4, the reduced squared ends 71 of these jogger bars project sufficiently so that a crank may be applied to them for oscillating them and causing them to knock against the flared portions 62 of the pans and thereby effect disengagement of laterally adjacent pans which may have become frozen together.

The system is so devised that the formation of frost is minimized insofar as possible. The only source of moisture is the air which may enter the hardening chamber with the conveyer and the moisture in the plastic bars of material which are carried by the conveyer. No moisture will be picked up from the body portions of the bars as they are wrapped with paper or the like, but the material is exposed at the ends of the bars. With a view to preventing as far as possible moisture from being picked up from the ends of the bars by the circulating cooling air, it will be observed that the ends of the bars 22 are protected from the air blast by a channel frame 72 carrying a V-shaped air stream divider 73 which causes part of the air from the fans to be blown over the conveyer and part of it to be blown under the conveyer. Thus the air stream is not blown against the ice cream exposed at the ends of the bars. The opposite ends of the bars do not need to be protected since the air is blowing lengthwise of the bars and past these ends and not against them.

While the operation of the apparatus will be in large measure apparent from the foregoing description it may be briefly recapitulated as follows:

Bars of enwrapped ice cream are continuously placed on the trough-like sections of the conveyer and carried through the lower portion of the hardening chamber. Air is continuously circulated in the substantially closed path indicated by the arrows in Fig. 2. The space above the bars and below the conveyers is comparatively thin so that the cold air is kept close to the bars and the fins on their carriers. The thinness of the lower chamber through which the bars pass insures a high velocity and rapid heat interchange with the bars, while the greater height of the upper chamber containing the evaporating coils provides for a much lower velocity of the air and a longer time for the air to be cooled to the desired low temperature. The inclination of the evaporating pipes insures a continuous supply of refrigerant liquid at the lower ends and a rapid removal of the evolved gas at the upper ends. The insulation between the upper and lower chambers prevents the bars or other material from being warmed up during defrosting.

As shown the conduits are arranged in planes at about 30° to the horizontal and each conduit is inclined at an angle of about 10° to the horizontal. By placing the conduits in inclined planes there is a scrubbing action because the air is deflected downwardly in passing between adjacent conduits, then passes horizontally and is again deflected downwardly or upwardly around the conduits in the next plane. The area between conduits in any inclined plane is at least equal to the vertical height of the chamber so that there may be free flow of the air, but a repeated deflection thereof and thus more intimate and forced contact with the conduits and their fins.

By inclining the conduits themselves there is produced a washing effect upon the inner surface of the conduits, that is, the gas which is produced by evaporation within the finned conduits tends to flow rapidly to the upper ends of the conduits and during such upward movement carries with it to some extent liquid which drops out and returns along the lower surface or wall of the conduit. This washing effect of the gas along the upper side of the conduits and return flow of liquid along the lower side remove bubbles which tend to adhere to the inner surface of the conduits.

By having the conduits inclined there is produced a lower static pressure on the liquid, whereas with conduits arranged vertically there may be more rapid escape of gas, but there is a higher static head and a corresponding raising of the boiling point. If the conduits be placed horizontally the gas resulting from evaporation of refrigerant in the conduits causes gas plugs and the conduits are often practically empty of liquid along sections thereof. This is particularly true in the use of finned conduits where the heat absorption due to the fins, together with the rapid air circulation, produces a relatively high rate of evaporation per unit of internal surface. Thus the placing of the conduits in inclined positions in inclined planes results in very high efficiency.

By reason of the inclined position of the planes and this spacing, the vertical spacing between the conduits may be comparatively slight and less than the diameter of the conduits, but the flow of the gaseous medium will be impeded to the minimum.

After defrosting of the pipes, the ice and liquid produced by defrosting may be removed by pulling out the pan sets, one at a time and dumping one pan at a time, then coupling the pans of such empty set together as they are replaced, and sliding them home. This may be done after the supply of hot gas has been shut off and the refrigerant liquid readmitted to the receiver and delivered from the bottom of the latter to the lower manifold 49.

Having thus described my invention, what I claim as new and desire to secure by Letters Patent is:

1. A refrigerating apparatus including a pair of chambers, a conveyer for advancing material to be refrigerated through one of said chambers, a plurality of substantially parallel refrigerating conduits extending transversely in the other chamber and arranged in a plurality of planes extending diagonally across the chamber, and means for circulating a gaseous medium through said chambers in series and transversely of said conveyer and of said chambers.

2. A refrigerating apparatus including a pair of chambers, means for circulating a gaseous medium through said chambers in series, a conveyer for advancing material to be refrigerated through one of said chambers in a direction transverse to that of the flow of gaseous medium in said chamber, and a plurality of substantially parallel refrigerating conduits in the other chamber and extending transversely of the path of flow of the gaseous medium and arranged in a plurality of planes at an angle to the horizontal, the conduits in each plane being spaced apart to a distance greater than the diameter of the planes, and the conduits in each plane being spaced vertically to a distance less than the diameter of the conduit.

3. A refrigerating apparatus including a pair of chambers, means for circulating a gaseous medium through said chambers in series, a conveyer for advancing material to be refrigerated through one of said chambers in a direction at right angles to the direction of flow of gaseous medium in said chamber, and a plurality of substantially parallel refrigerating conduits in the other chamber and extending transversely of the path of flow of the gaseous medium and arranged in a plurality of planes extending diagonally across the chamber, and each of said conduits being inclined in respect to the horizontal.

4. A refrigerating apparatus including a pair of chambers, means for circulating a gaseous medium through said chambers in series, a conveyer for advancing material to be refrigerated through one of said chambers, a plurality of substantially parallel refrigerating conduits in the other chamber and extending transversely of the path of flow of the gaseous medium and inclined in respect to the horizontal, a header below said conduits for delivering a volatile refrigerant to the lower end of each of said conduits, and a header above said conduits for receiving the refrigerant gas therefrom.

5. A refrigerating apparatus including a pair of chambers, means for circulating a gaseous medium through said chambers in series, a conveyer for advancing material to be refrigerated through one of said chambers transversely of the direction of flow of said gaseous medium in said chamber, a plurality of substantially parallel refrigerating conduits in the other chamber and extending transversely of the path of flow of the gaseous medium, each of said conduits being inclined in respect to the horizontal, a receiver adjacent to the upper ends of said conduits and connected to said upper ends above the normal liquid level in the receiver, a manifold connected to the lower ends of said conduits, and means for delivering refrigerant liquid from said receiver to said manifold, said receiver having a liquid supply inlet and a gaseous outlet.

6. A refrigerating apparatus including a pair of chambers, means for circulating a gaseous medium through said chamber in series, a conveyer for advancing material to be refrigerated through one of said chambers, and a plurality of substantially parallel refrigerating conduits in the other chamber and extending transversely of the path of flow of the gaseous medium and arranged in a plurality of planes extending diagonally across the chamber, and each of said conduits being inclined in respect to the horizontal, said conduits having heat absorbing fins, the fins of each conduit terminating closely adjacent to the fins of the adjacent conduits of the same plane whereby all of the gaseous medium circulated through said last mentioned chamber is forced to pass in intimate contact with said fins.

7. A refrigerating apparatus including a pair of superposed inclined chambers, a conveyer for advancing material through the lower chamber from the upper end toward the lower, a plurality of refrigerating conduits in the upper chamber extending transversely of and substantially parallel to the plane of movement of said conveyer, and means for circulating a gaseous medium through said chambers in series and transversely of said conveyer and said conduits.

8. A refrigerating apparatus including a pair of superposed inclined chambers, a conveyer for advancing material through the lower chamber from the upper end toward the lower, a plurality of refrigerating conduits in the upper chamber extending transversely of and substantially parallel to the plane of movement of said conveyer, means for circulating a gaseous medium through said chambers in series and transversely of said conveyer and said conduits, a liquid refrigerant vessel at substantially the elevation of the upper ends of said conduits, and means for supplying refrigerant from said receiver to the lower ends of said conduits.

9. A refrigerating apparatus including a casing having a transverse partition dividing the same into a pair of superposed chambers inclined in respect to the horizontal, the lower chamber having openings adjacent to the upper end thereof, an endless conveyer having a run extending in an upward inclined direction through said last mentioned chamber and entering and leaving said casing through said openings, said conveyer including transversely extending grooved bars of a length substantially equal to the width of said chamber and adapted to carry bars to be refrigerated through the last mentioned chamber, a plurality of refrigerating conduits in the other chamber, and means for circulating air through said chambers in series and in a direction parallel to said bars.

10. A refrigerating apparatus including a pair of chambers, means for circulating gaseous medium through said chambers in series, an endless conveyer movable through one of said chambers and including closely juxtaposed trough shaped bars having fins extending lengthwise thereof upon the under side thereof, said bars extending parallel to the direction of flow of the gaseous medium in said last mentioned chamber, and said conveyer being movable to the direction of said flow, and means in the other chamber for refrigerating the gaseous medium.

11. A refrigerating apparatus adapted to be encased to form part of a closed air cooling system, said apparatus including a plurality of headers and a plurality of conduits connecting the headers in pairs, the two headers of each pair being disposed at different elevations and at an angle to the horizontal and to the vertical, a manifold connected to all of the lower headers, a liquid refrigerant receptacle at a higher elevation than said manifold and connected thereto for the delivery of liquid refrigerant to the upper ends of said conduits, and means for conducting gas from the upper headers to said receptacle.

12. A refrigerating apparatus including a pair of superposed chambers connected at opposite sides to form a closed circuit for a gaseous medium, means for circulating the gaseous medium in said circuit, means in the upper chamber for chilling the gaseous medium, means for passing articles to be refrigerated through the lower chamber, the wall between said chambers being formed of insulating material.

CLARENCE W. VOGT.